May 15, 1962 H. HENNE 3,034,887
PROCESS FOR MAKING STEEL
Filed June 11, 1959 3 Sheets-Sheet 1

Hans Henne
INVENTOR.

BY Clarence A. O'Brien
and Harvey B. Jacobson
Attorneys

May 15, 1962 H. HENNE 3,034,887
PROCESS FOR MAKING STEEL
Filed June 11, 1959 3 Sheets-Sheet 2

Hans Henne
INVENTOR.

May 15, 1962     H. HENNE     3,034,887
PROCESS FOR MAKING STEEL
Filed June 11, 1959     3 Sheets-Sheet 3
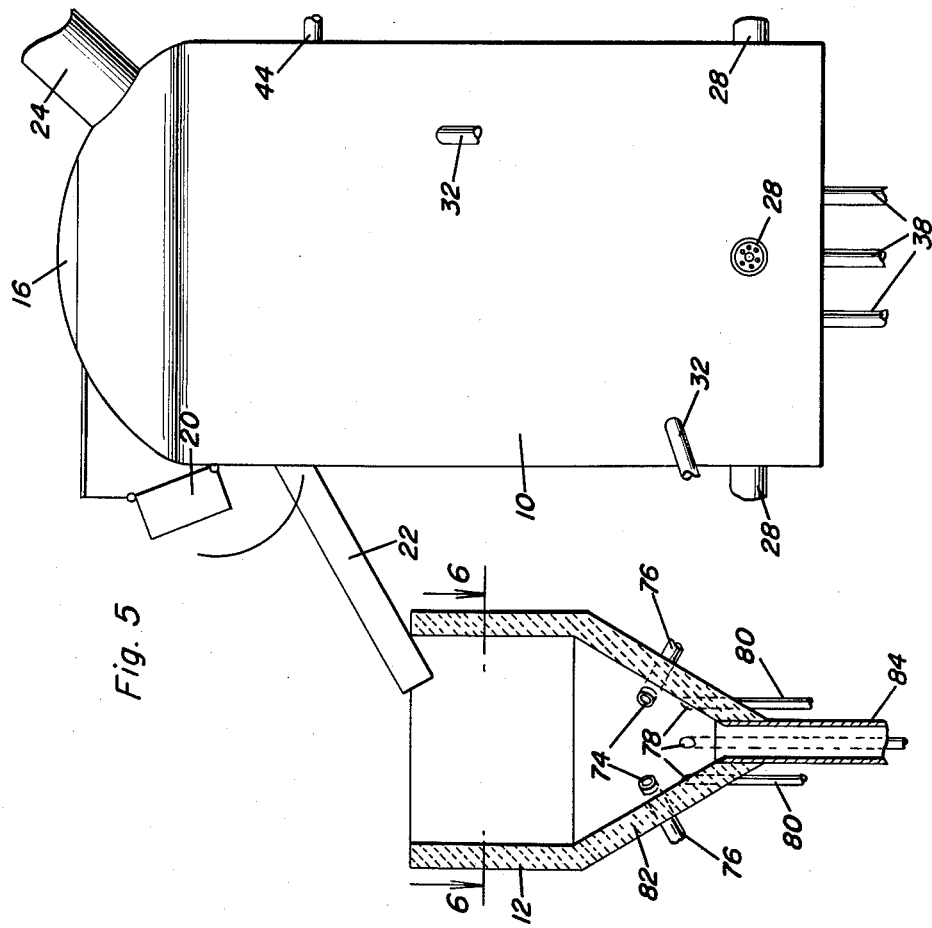
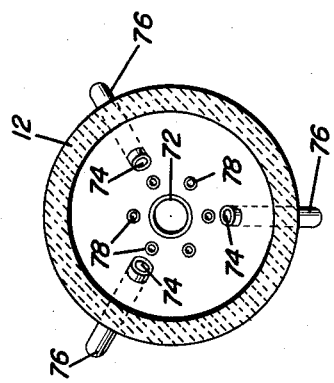
Hans Henne
INVENTOR United States Patent Office 3,034,887
Patented May 15, 1962

3,034,887
PROCESS FOR MAKING STEEL
Hans Henne, 462 Willow Road, Hellertown, Pa., assignor of fifty percent to Leonard M. Cohn, Hellertown, Pa.
Filed June 11, 1959, Ser. No. 819,741
5 Claims. (Cl. 75—60)

This invention comprises a novel and useful process for making steel and more particularly relates to a process and apparatus to effect the making of steel of a superior quality and in an improved manner.

The primary object of this invention is to provide a method and an apparatus for making steel which will enable a steel to be obtained having a greater freedom from ashes, slag and other dross and with a relatively highly refined characteristic.

A further object of the invention is to provide a method and an apparatus in accordance with the foregoing object which while obtaining a greatly superior and improved product shall also be simple and practical in its construction and operation and shall be extremely economical and have a very great thermal efficiency in its operation.

A further and more specific object of the invention is to provide an apparatus and a process wherein a superior mixing of the ingredients of the charge in the melting chamber is obtained and a more rapid, efficient and complete separation of the dross from the metal is secured during the melting of the charge.

Yet another object of the invention is to provide a process and apparatus which will obviate to a large extent or completely the use of mechanical apparatus for the mixing of the ingredients of the charge within the melting chamber; and for the removal of and the separation of the dross from the refined metal in the melt.

Yet another important object of the invention in accordance with the preceding object is to provide a process and a means whereby air heated to a temperature slightly less than that of the melting point of the melt may be introduced into the melting chamber below the surface of the melt and effect thereby an improved circulation and mixing within the melt; a more effective separation of the ashes and slag resulting from the melting of the ingredients of the charge; and will maintain the temperature of the melt or supplement the heating of the same by the heat input of the introduced heated air.

A still further very important object of the invention is to provide a process and a means whereby the slag, ashes and dross may be effectively and economically removed from the surface of the melt by means of an air blast directed across the surface of the melt and against the dross for driving the latter through the slag discharge opening of the furnace, this air being heated to a temperature slightly less than that of the melting point of the charge whereby to minimize cooling of the charge by the air blast.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
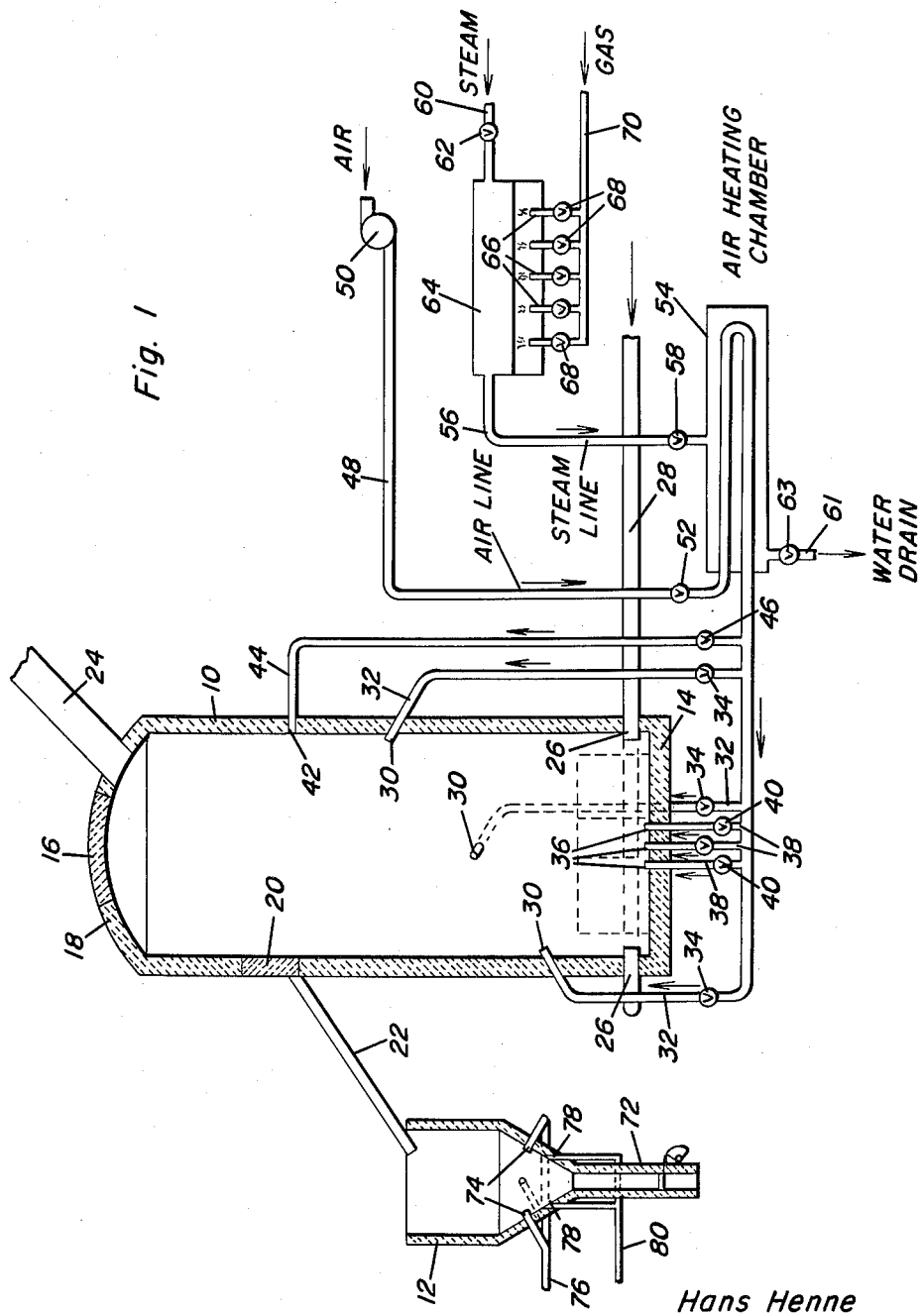
FIGURE 1 is a diagrammatic view partly in vertical section showing an apparatus for carrying out the process of this invention, certain concealed parts being shown in dotted lines therein.

FIGURE 5 is a detail view taken upon an enlarged scale and showing in elevation the furnace of FIGURE 1 and in vertical section a slag treating apparatus associated therewith in accordance with this invention; and FIGURE 6 is a horizontal sectional view taken substantially upon the plane indicated by section line 6—6 of FIGURE 5 and showing the arrangement of the nozzles in the slag treating apparatus.

Figure 2:
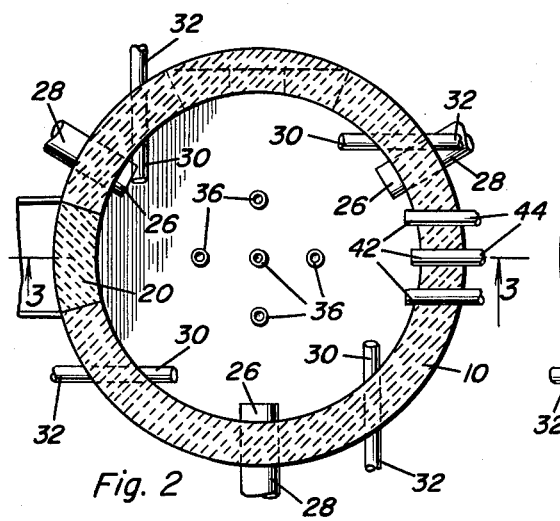
FIGURE 2 is a horizontal sectional view through the upper portion of the furnace, being taken substantially upon the plane indicated by section line 2—2 of FIGURE 3 and showing the disposition of various air injecting nozzles in accordance with this invention.

Referring now particularly to FIGURES 1 and 2 it will be observed that the apparatus illustrated in the drawings for carrying out the principles of this invention both as to the structure for making steel as well as the process by which steel is made includes the steel making furnace 10 and a slag receiving or collecting pit 12 which comprises a slag furnace for treating or processing the slag for salvaging and recovering any steel content therefrom.

The steel furnace 10 is of any conventional type, that illustrated being of the well known Bessemer type although it will be understood that the principles of this invention are not limited to this particular process for making steel. The furnace includes the usual bottom wall 14 and is provided with a customary access opening for obtaining access to the interior of the furnace when it is necessary to replace the lining of the same and when it is necessary to tap or discharge the melt of steel produced by the operation of the furnace.

The furnace further includes the charging opening 16 in its roof which is removed when it is desired to insert the ingredients of the charge or mix which is to be processed within the furnace together with an inspection opening in the roof 18. There is further provided a slag discharge opening 20 in the side wall of the furnace by means of which slag, ashes and dross resulting from the melting of the ore and the limestone charge of the furnace may be removed from the top of the melt from time to time. Also shown in FIGURE 1 is a discharge chute 22 which extends from the side wall of the furnace just below the discharge opening 20 and has its lower end terminating in and discharging by gravity into the open upper end of a funnel-like receptacle comprising the above mentioned slag furnace 12.

Also shown in FIGURES 1 and 2 by the numeral 24 is a smoke duct by which the fumes and combustion gases created by the operation of the furnace are discharged from the melting chamber in the interior of the latter.

In accordance with the present invention the furnace of this character and of this generally conventional type has applied thereto several sets of air injection nozzles with associated conduits and valves in order to carry out the process of making steel in accordance with this invention.

Figure 3:
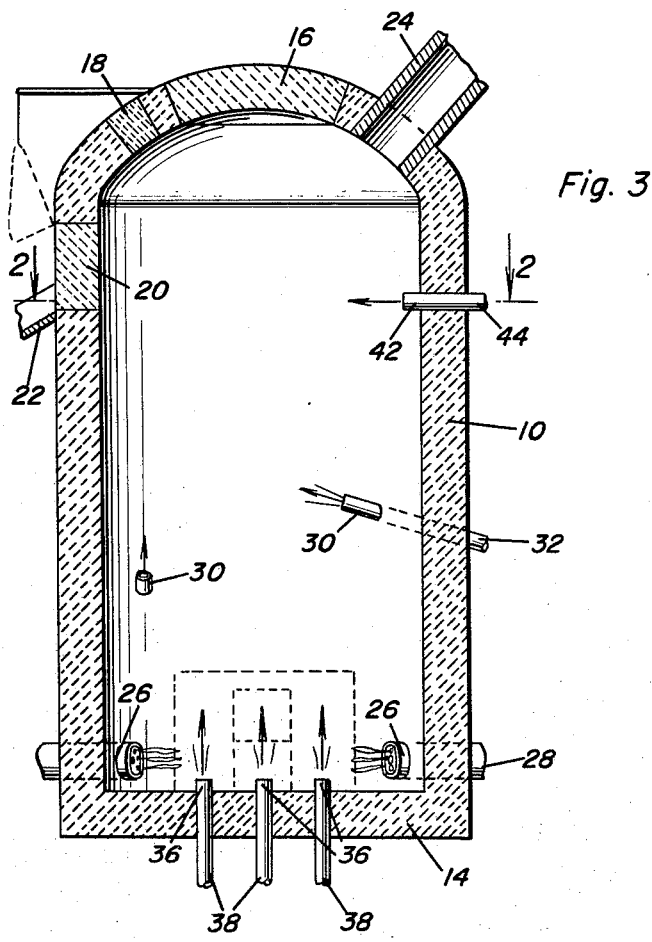
FIGURE 3 is a vertical sectional view taken substantially upon the plane indicated by section line 3—3 of FIGURE 2 and showing further details of the construction of the furnace and the arrangement of the nozzles therein in accordance with this invention.

Indicated by the numeral 26 and shown also in FIGURES 2 and 3 are a set of horizontally disposed and generally radially arranged fuel nozzles disposed upon the interior of the furnace in the side walls thereof and just above the bottom wall 14 and by means of which the fuel to be burned in the furnace and provide the means for melting the charge is inducted into the furnace. These nozzles are supplied with fuel by the conduit means 28 as diagrammatically indicated in FIGURE 1. It will be understood that a separate control means is preferably provided for each of the fuel nozzles and that fuel from different sources may be supplied to the different nozzles. For example, coke gas or carbon monoxide may be supplied to initiate combustion and this may be replaced with gas or oil for the normal operation of the nozzle. Further, two nozzles may be employed to initiate or fire the combustion and melt the charge within the furnace while the third nozzle may be placed in operation when it is desired to either speed up the melting of the charge and/or to effect a greater mixing and circulation of the molten charge during the operation of the furnace.

Inasmuch, however, as the arrangement operation and control of the fuel nozzles is not in itself a limiting factor in the operation of this invention and since conventional nozzles and control means can be provided for this purpose, a further description of the same is deemed to be unnecessary.

Figure 4:
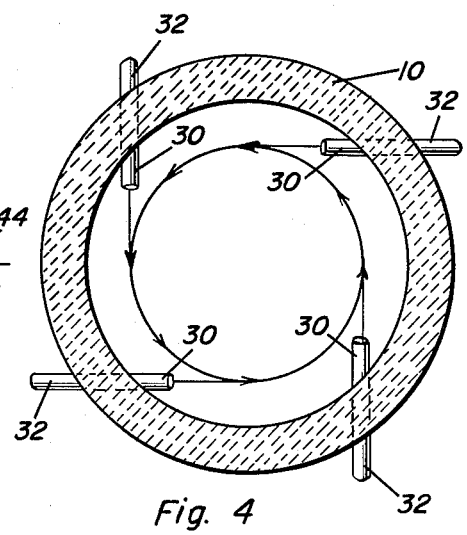
FIGURE 4 is a horizontal sectional view of the lower portion of the furnace showing the position of the circulating and mixing air nozzles therein.

Three different sets of air nozzles are applied to the furnace 10 in carrying out the process of this invention. The first set of nozzles is indicated by the numeral 30 and it will be observed that these nozzles, which may be four in number as shown in FIGURES 2 and 4, are spaced both vertically and circumferentially of the melting chamber as will be apparent from a consideration of FIGURES 1 and 2, in conjunction with FIGURES 3 and 4. As shown best in FIGURE 4, this set of nozzles is disposed tangentially of the chamber so as to produce a swirling action therein as shown by the arrows in FIGURE 4. Each of these nozzles receives heated air under pressure by means of conduits 32 under the control of the valves 34. The nozzles 30 comprise air injecting and air circulating nozzles and are so positioned that the heated air is injected into the melt and below the upper level or top surface thereof and in such a manner as to produce by the injection of the air a swirling or circulatory movement of the molten material to thereby produce a better mixing of the various components in the charge, a more uniform heating and melting of the same together with a better separation of the dross from the metal.

A second set of nozzles indicated by the numeral 36 is disposed in the bottom 14 of the furnace and project upwardly therein for discharging heated air upwardly through the melt or molten charge in the furnace. These nozzles comprise mixing nozzles and by the passage of the air therefrom upwardly through the melt in the furnace serve to break up any remaining stratification of the alternate layers of ore, limestone and scrap iron with which the furnace is customarily charged in the process of making steel, and through this agitating and mixing action, serve to drive the lighter ashes, slag and dross to the top of the molten melt in the furnace from which it may be subsequently removed.

The bottom of mixing nozzles 36 receive their supply of air from the conduits 38, each under the control of its adjusting or regulating valve 40.

A third set of air nozzles is provided, these being the nozzles shown at 42 and being disposed, as shown in FIGURE 2, preferably at the same level as and opposite the discharge means 20 by which the slag is discharged from the furnace. The nozzles 42 comprise the injection nozzles and receive their supply of heated air by means of a conduit 44 under the control of the valve 46.

The arrangement is such that when it is desired to bring into operation the ejector nozzles 42, the discharge opening 20 is uncovered as will be shown by comparison of the full and dotted line showing in FIGURE 3, and the nozzles 42 being placed in operation, their air blast will impinge upon the slag floating upon the top of the molten metal and drive this slag towards and through the discharge opening 20 from whence it descends by the chute 22 into the slag collecting pit or slag furnace 12.

In accordance with this invention heated air may be economically supplied from a single source to each of the three sets of nozzles. Thus an air supply line 48 receiving air from a blower as at 50 delivers air under the control of a valve 52 and through an air preheater 54 into the above-mentioned supply conduits 32, 38 and 44 by means of their individual control valves as diagrammatically illustrated in FIGURE 1. This air is preferably heated to a temperature which is slightly less than the melting point of the charge or the melting point of steel. The purpose of heating the air is to avoid cooling the charge to any appreciable extent when the air blasts are ejected into the charge and thus economize on the consumption of fuel by the fuel supply nozzles 26. The conduits preferably are of a suitable material to stand the high temperature of the air and may be of a refractory substance if desired.

While the air preheater 54 may be of any suitable design, a preferred arrangement is to employ super heated steam as a heating medium in this heater. For this purpose, the air supply line 48 extends through the interior of the heater 54 and is contacted by the steam passing through the heater. Super heated steam is delivered by the steam supply line 56 and under the control of a control valve 58 into the air preheater 54 where it imparts the desired heat to the air and brings the latter to a desired temperature. Steam is discharged from the heater as by the discharge conduit 61 having control valve 63.

Steam from any suitable source such as from a boiler, the steam engine or the like is supplied by conduit 60 under the control of valve 62 into the steam superheater 64. In the superheater the coils or conduits for the steam are subjected to heat by a plurality of burners 66 each having control valves 68 thereon by which the fuel supplied to the burner from a line 70 from any suitable source such as a supply of gas or the like is regulated. It will thus be seen that the steam is superheated to any desired temperature and in turn gives up its heat in the heat exchanger of the air preheater 54 which air is introduced into the charge and the melting chamber of the furnace.

Referring now more particularly to FIGURES 5 and 6 it will be observed that the slag furnace 12 is somewhat similar in character to the furnace 10. The slag introduced from time to time into the slag furnace 12 through the discharge chute 22 is maintained in a molten condition by fuel heating nozzles, not shown, similar to the heating nozzles 26 of the steel furnace. Heated air is supplied by a pair of nozzles 74 by means of conduit 76 which are similar to the nozzles and conduits 30 and 32 of the furnace 10. These nozzles serving to circulate the air through the molten material in the slag furnace. A second set of nozzles 78 opens upwardly from the bottom of the furnace beneath the slag and is supplied by heated air to the conduits 80, and serve the same functions as corresponding nozzles and conduits 36 and 38 of the furnace 10, serving to separate and force upwardly the draughts while permitting the molten metal to pass downwardly along the tapering conical sides 82 of the slag furnace and be eventually discharged therefrom through the discharge passage 84 therefrom. The metal thus reclaimed from the slag is employed as a part of the ore with which the furnace 10 is charged during its operation.

It is believed from the foregoing that the construction and operation of the apparatus itself will now be readily apparent.

A method of making steel of an exceedingly refined and pure character in accordance with this invention, and which may be practiced by the apparatus above described, involves the following steps and is as follows:

In the first step, the furnace is charged with the steel making ingredients by removing the roof closure 16 and then depositing alternate layers of ore, limestone and steel scrap, these layers are being repeated until the melting chamber in the furnace is filled to a desired level, this being usually the top rim of the slag discharge port 20.

With the furnace charged, the second step consists of initiating combustion therein and for this purpose, after the charging opening 16 is replaced, fuel is supplied through the fuel jets 26. For initiating combustion this fuel may consist of oxygen and coke gas and after the combustion has started, replacing this with oxygen and oil. These burners or fuel jets supply the main source of heat to the furnace during the steel making operation therein. However, by the introduction of supplemental heat through the heated air blasts as set forth hereinafter, it is evident that considerably less fuel is required than if this supplemental heat were not so introduced, thereby contributing toward the thermal efficiency of this process of making steel and reducing the cost of the same.

The third step in the process consists, after all of the charge in the furnace has been melted, in injecting heated air from the jets 30 while injecting further fuel from additional ones of the fuel jets 26. The purpose of this by the forced introduced blast of heated air and fuel to effect the circulation of the melt and obtain a mixing of the same in the melting chamber of the furnace. By the introduction of the heated air blast from the nozzles 30 below the surface of the melt, and by the introduction of the combustion products through the fuel nozzles 26, a considerable turbulence is set up within the molten material in the furnace which tends to thoroughly mix the same, agitate and cause the ashes, slag and dross arising from the stratified layers of the charging ingredients of the furnace to rise to the top of the melt from whence it may be easily removed.

After this mixing and circulating step has been continued in operation for a suitable period of time, as for example for about 30 minutes, the bottom or mixing jets 36 are placed in operation for a suitable period as for about 20 minutes and their blasts of heated air are caused to pass directly upwardly through the melt. This has the effect of adequately and completely breaking up any remaining stratification of the layers of slag, ash or dross from the original components of the charge of furnace and convey them to the surface of the melt.

The fifth step of the process then consists in discontinuing the operation of the bottom jets 36, then opening the slag discharge door 20, and thereupon operating the ejector jets 42 for a sufficient period of time, as for example for 10 minutes, to blow the slag and draughts across the top of the melt and out the discharge door, from whence it travels by the chute 22 into the slag collector or furnace 12. It will be observed that for this purpose the ejector jets 42 are so positioned, as shown in FIGURE 2, that they will strike the dross or slag and drive it across the top of the melt and through the discharge port 20.

As the sixth step of the method, the ejector jets are stopped; the discharge port 20 is closed; the charging door 16 of the roof is opened and scrap iron is added until the top level of the heat in the melting chamber again reaches the desired level, as the top of the rim of the discharge port 20. Thereupon the charging door 16 is closed.

As the seventh step of the process, heating by the fuel jets 26 is continued for a suitable period, as for example for one hour, to effect complete melting of the added scrap iron from the last step.

In the eighth step, the bottom jets 36 are again placed in operation for a suitable period, as for example for about 30 minutes, or until the slag melted by the preceding step floats or is forced to the top of the heat.

In the ninth step, the bottom jets 36 are closed; the discharge port 20 is again opened; the ejector jets 42 are again started and placed in operation for suitable period, as for example 10 minutes, driving off the slag which is again accumulated on the top of the melt.

Upon the completion of this step, the tenth step consists of discontinuing operation of the ejector jets 42; closing the discharge port 20; opening the charging opening 16; and again adding metal scrap to again reach the desired level of the melt.

The eleventh step then consists of continuing the heating for a suitable period as for one hour in the same manner as for step number seven.

As the twelfth step, the step number 8 is again performed, the bottom jets 36 being placed in operation for a period of about 30 minutes.

For the thirteenth step, the inspection opening 18 in the roof is opened and the melt is tested for the presence of slag thereon.

If slag shows, the fourteenth step consists in repeating step 5 and discharging this slag through the discharge port 20 by operation of the jets 42 for a period of about 10 minutes.

In the fifteenth step, step thirteen is repeated and a test again made for slag. If there is slag still present, step ten is repeated, scrap metal is again added and step eleven is repeated to melt the scrap metal. This sequence of testing for slag, and if slag is found driving off the slag adding scrap metal and re-melting is continued until such time as the test for slag indicates that the melt is clear of slag. At this time, the furnace is tapped and drained of its molten metal in the usual manner. However, it is preferred in accordance with this invention and to obtain metal of the greatest purity to tap the furnace into a ladle; strain the molten material through the ladle into a second ladle; and continue this operation until the molten metal has flowed through a series of five ladles. From the fifth ladle the metal of extremely pure quality is then poured into molds. During this straining operation it will be observed that any slag in the metal will tend to cool upon the sides of the ladles and thus will be removed from the molten metal ultimately discharged from the last ladle of the series into the molds.

As a corollary to or as a supplement to the foregoing method, the operation of the slag furnace is as follows. The slag discharged into and connected in the slag furnace by the steps 5, 9 and 14 previously described is maintained in a molten condition in the slag furnace by the operation of the fuel jets therein, not shown, but described hereinbefore. Thereafter, the hot air jets 74 and 78 are placed in operation separating the slag from the molten metal and forcing the slag to the top. The molten metal around the lower end is then tapped or discharged through the discharge opening 72, the slag tending to collect, remain and solidify upon the inclined walls 82 of the slag furnace. As above mentioned the pure metal thus salvaged from the slag can be re-introduced into the steel furnace 10 either as a component in the first step of the process; or as the additional scrap iron introduced or as a part of the additional metal introduced in steps 6, 10 and 15.

The arrangement shown in FIGURE 1 and hereinbefore described represents a simplified or basic form of the invention. In actual practice, it will usually be preferred to replace the single air heater 54 which preheats the air for the five conduits 32, 38, 44, 76 and 80 with a separate air heater 54 for each conduit and with a separate control 58 for the flow of superheated steam from 56 into each air heater 54 and a separate control 63 for the discharge of exhaust steam therefrom into the common steam discharge line 61.

Further in addition to the common supply of air from 50 through the main control valve 52, each air conduit will have its own individual control valves for the flow of air into and from its individual heater 54.

Thus a more precise adjustment of the volume of flow and of the temperature of the air for each set of nozzles is effected; and a more accurate control of the operation of the air heaters 54 is secured.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of making steel comprising charging a furnace to a predetermined level with the ingredients for making steel, heating the furnace and its charge and melting the latter, adding further ingredients to said charge and melting the added ingredients to thereby bring the level of the melt to said predetermined level, supplementing the heating of the melt by introducing into the melt blasts of heated air at a temperature slightly less than the melting point of the melt, removing the slag and ashes produced by said step of melting from the top of the melt by a blast of heated air across the surface of the melt.

2. The method of claim 1 including the step of introducing a blast of heated air upwardly through the melt and thereby mixing the ingredients of the melt and driving the slag and ashes to the top of the melt and additionally adding blasts of heated air tangentially into the melt and below the surface of the latter at positions spaced both vertically and circumferentially of the melt.

3. An apparatus for making steel comprising a furnace having a melting chamber for receiving therein a charge of ingredients for making steel, means for applying heat to said furnace for melting said charge, means for causing a circulation and mixing of the charge during the melting thereof, means for removing from the furnace the slag and ashes produced from said ingredients during the melting of said charge, said means for causing circulation and mixing including nozzles for directing into said charge and below the surface thereof, and at positions spaced vertically and circumferentially of said chamber blasts of air heated to a temperature slightly less than the melting point of said charge.

4. An apparatus for making steel comprising a furnace having a melting chamber for receiving therein a charge of ingredients for making steel, means for applying heat to said furnace for melting said charge, means for causing a circulation and mixing of the charge during the melting thereof, means for removing from the furnace the slag and ashes produced from said ingredients during the melting of said charge, said means for removing slag and ashes including a slag discharge port having a closure, nozzles for sweeping the slag and ashes from the surface of the melt by biasts of heated air directed against said slag and ashes and across the surface of the melt.

5. An apparatus for making steel comprising a furnace having a melting chamber for receiving therein a charge of ingredients for making steel, means for applying heat to said furnace for melting said charge, means for causing a circulation and mixing of the charge during the melting thereof, means for removing from the furnace the slag and ashes produced from said ingredients during the melting of said charge, means for introducing supplemental heat into said charge comprising nozzles extending into said melting chamber beneath the surface of the melt for introducing blasts of air heated to a temperature slightly less than the melting point of said charge.

References Cited in the file of this patent

UNITED STATES PATENTS

| 33,090 | Lane | Aug. 20, 1861 |
| 94,997 | Bessemer | Sept. 21, 1869 |
| 1,140,550 | Weissenburger | May 25, 1915 |
| 1,328,803 | Bagley | Jan. 27, 1920 |